US007686150B2

(12) United States Patent
Hsieh

(10) Patent No.: US 7,686,150 B2
(45) Date of Patent: Mar. 30, 2010

(54) GOVERNOR DEVICE FOR DOOR

(76) Inventor: Chung-Hsien Hsieh, 116 Fen Liao Road, Section 1, Lin-Kou Hsiang, Taipei Hsien (TW)

(*) Notice: Subject to any disclaimer, the term of this patent is extended or adjusted under 35 U.S.C. 154(b) by 470 days.

(21) Appl. No.: 11/702,334

(22) Filed: Feb. 5, 2007

(65) Prior Publication Data

US 2008/0185469 A1 Aug. 7, 2008

(51) Int. Cl.
*F16H 57/02* (2006.01)

(52) U.S. Cl. ......................... 192/223.2; 160/297; 160/8

(58) Field of Classification Search ................ 192/223, 192/223.2

See application file for complete search history.

(56) References Cited

U.S. PATENT DOCUMENTS

| | | | | |
|---|---|---|---|---|
| 2,755,081 | A * | 7/1956 | Johnson et al. | 160/188 |
| 3,637,004 | A * | 1/1972 | Wardlaw et al. | 160/133 |
| 3,802,281 | A * | 4/1974 | Clarke | 74/89.39 |
| 4,613,023 | A * | 9/1986 | Fairbairn et al. | 192/223.2 |
| 4,697,676 | A * | 10/1987 | Haake | 192/223.2 |
| 4,838,333 | A * | 6/1989 | Mottura | 160/305 |
| 5,501,117 | A | 3/1996 | Mensing et al. | |
| 5,836,076 | A * | 11/1998 | Duta et al. | 29/893.1 |
| 6,328,655 | B1 | 12/2001 | Zimmermann et al. | |
| 6,328,665 | B1 | 12/2001 | Gormley | |
| 7,367,891 | B2 * | 5/2008 | Bae | 464/30 |
| 2003/0000796 | A1 * | 1/2003 | Kawai et al. | 192/223.2 |
| 2008/0210386 | A1 * | 9/2008 | Neuhaus | 160/133 |

* cited by examiner

*Primary Examiner*—David D Le
*Assistant Examiner*—Ryan Dodd
(74) *Attorney, Agent, or Firm*—Buckman & Archer

(57) ABSTRACT

This invention disclosed a speed limit device for door, which comprises: an input shaft with one end driven by a door motor, and having the first gear and the second gear configured at the other end simultaneously driving a hollow shaft and a third shaft, and the center of the hollow shaft accommodates and fixes one end of a reel, and the third shaft is connected with an extension shaft; a brake device, which includes an active gear fixed with the extension shaft; a passive gear is pivoted on a hub, and the hub is fixed with the reel and rotating with the hollow shaft; an inert wheel located between the active gear and the passive gear to adjust the passive gear to have the same rotation speed with the hollow shaft; a clutch mechanism, which could restrain the synchronous operation between the passive gear and the hub without any positional difference, and when the rotation speed of the reel has the abnormal change, the clutch mechanism generates the positional difference condition necessary to lock the hub to a fixed object to prevent the rolling door from falling.

12 Claims, 4 Drawing Sheets

GOVERNOR DEVICE FOR DOOR

TECHNICAL FIELD

The present invention relates to a governor device for door, and particularly to a governor device for preventing the stalling and falling of rolling door due to gear abrasion of the reel.

BACKGROUND OF THE INVENTION

There are a lot of motor shaft adaptation system techniques being disclosed, such as U.S. Pat. No. 6,328,655 B1 and U.S. Pat. No. 5,501,117. The motor shaft adaptation system technique has been widely applied in the door machine mechanism for driving the door, but the safety was easily ignored.

The conventional door, such as the rolling door with vertical lifting and descending, all have very serious design criteria based on the safety consideration. In ideal case, the door should not have any possibility of danger caused by factitious or non-factitious factors under any operational conditions. The industry has the common goal to improve the product toward this target, so as to reduce the danger for door to the minimum.

In the door system, the reel mechanism, having the lowest failure probability compared to other mechanisms, belongs to the mechanism having better safety. Thus, the person skilled in the art usually pays attention to the improvement on the mechanism with higher failure probability, such as control mechanism, and often ignores the potential danger of the reel mechanism. However, it is appreciated by the person skilled in the art that, although the reel mechanism has better safety, it still could not prevent the abrasion problem between gear sets after long-term usage. Once the gears of the reel mechanism have been worn to a certain critical level, in the case which is not detected by an effective detection mechanism, there will be a great danger of the rolling door to stall and fall down.

SUMMARY OF INVENTION

The main object of the present invention is to provide a governor device for door, which could prevent the abrasion of the gear of the reel which might causes the danger of stalling and falling of the rolling door, so that the safety protection for the reel mechanism is enhanced greatly.

For the realizing of the foregoing and other objects, the governor device for door according to the present invention comprises: an input shaft having two ends, one end of which is driven by a door machine to rotate a first gear and a second gear respectively provided at two positions on the other end; a hollow shaft with both ends pivoted rotatively, which has a first driven gear correspondingly meshed with the first gear, and the axle center is made to be hollow to serve as an housing portion for accommodating one end of the reel winding the door strip panels; a third shaft with both ends pivoted rotatively, which has a second driven gear correspondingly meshed with the second gear, and has an extension shaft at the end in the same direction as the reel; a brake device, which includes an active gear with its center fixed on the extension shaft of the third shaft; a passive gear pivoted on a first hub which is fixed on the reel to be rotated together with the hollow shaft; an idle wheel, which is located between the active gear and the passive gear for adjusting the rotation speed of the passive gear to be the same as the hollow shaft; and a clutch mechanism for restraining the synchronous operation between the passive gear and the first hub under no positional difference condition.

According to the governor device for door of the present invention, in normal operation, the passive gear without is driven by the third shaft indirectly, and is synchronously rotated with the hollow shaft of the reel. When the rotation speed of the reel has abnormal change due to, for example, serious gear abrasion of the reel or due to encountering an obstacle during lifting and descending of the rolling door to cause the exceeding or lagging of the rotation speed of the reel to that of the passive gear, the clutch mechanism will be actuated the positional difference to lock the hub, and brake the reel to prevent from the fast falling of the rolling door or the damage to the transmission mechanism.

According to the present invention, the active gear is pivoted on the extension shaft, and the extension shaft and the axle hole of the active gear are loosely fitted there between, the rotational transmission between them is conducted by the frictional contact of both with an elastic body which is pressed and deformed by both. The active gear employs the frictional force to sufficiently drive the passive gear without load, but not enough to drive the passive gear with load. Therefore, even in the case that the clutch mechanism is locked and the overload protection device does not cut off the power, it will not damage the transmission mechanism, which is another object of the present invention.

DETAILED DESCRIPTION OF PREFERRED EMBODIMENTS

The technical features according to the present invention will be further described with the embodiments, and these embodiments are only preferred embodiments, and should not limit the implementation scope of the present invention. It will become more apparent of the present invention by the following detailed description of a preferred embodiment in reference to the accompanying drawings.

Figure 2:
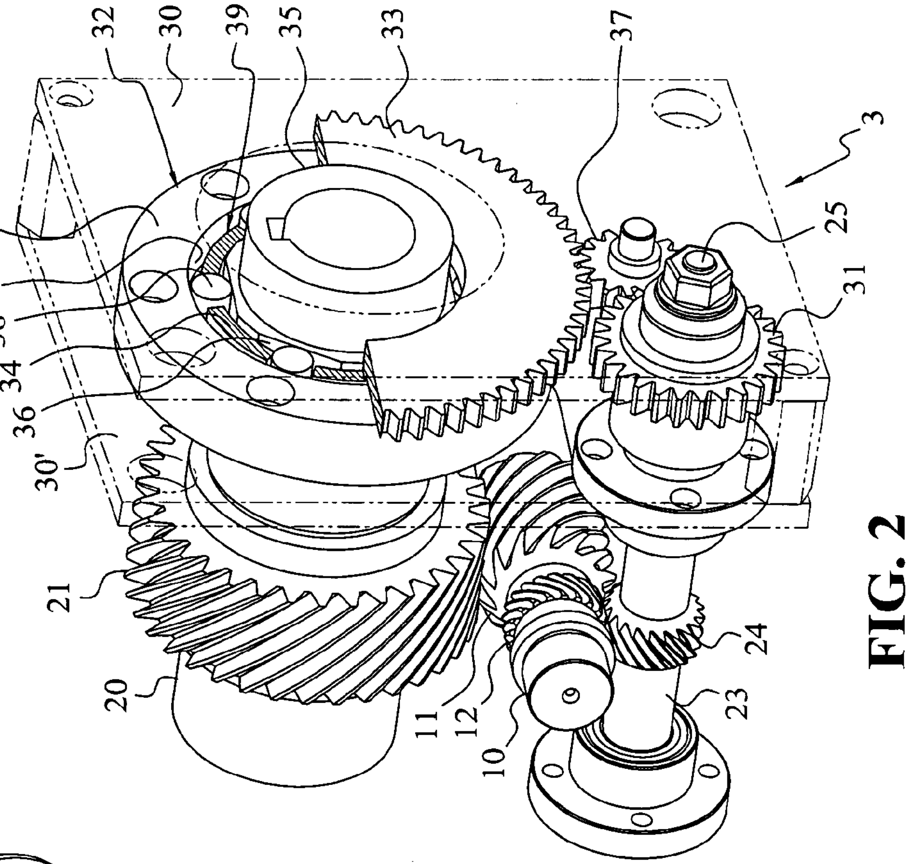
FIG. 2 is a perspective view of the governor device for door according to the present invention, wherein part of the components have been omitted.
Figure 1:
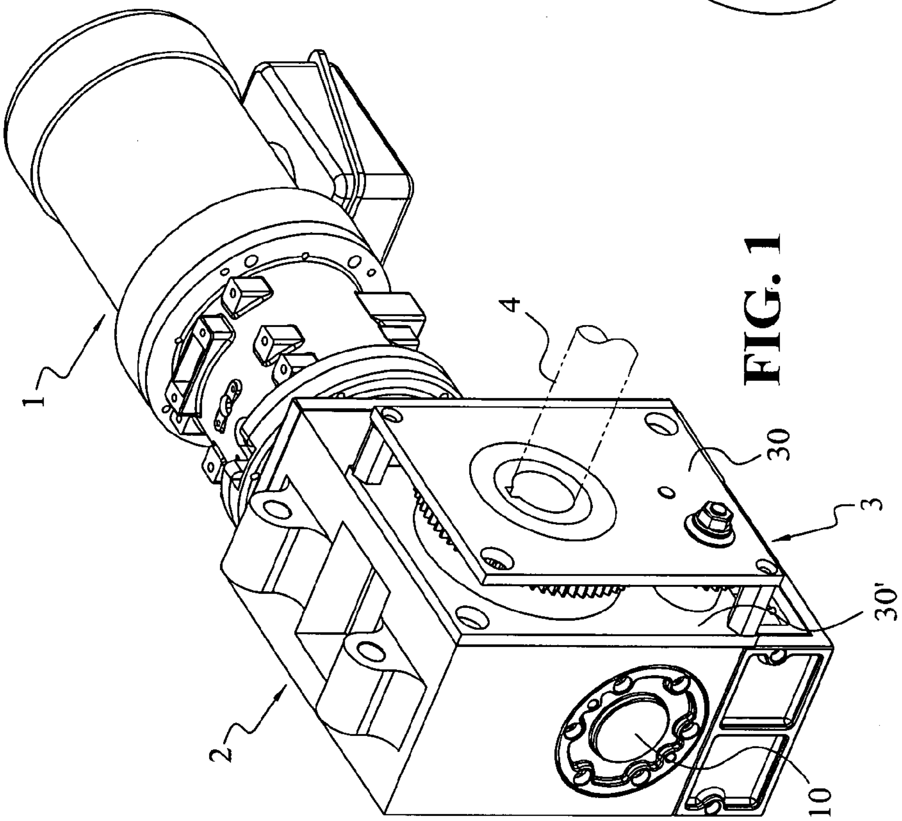
FIG. 1 is a perspective view of the governor limit device for door and the assembly configuration of the associated door machine according to the present invention.
Figure 4:
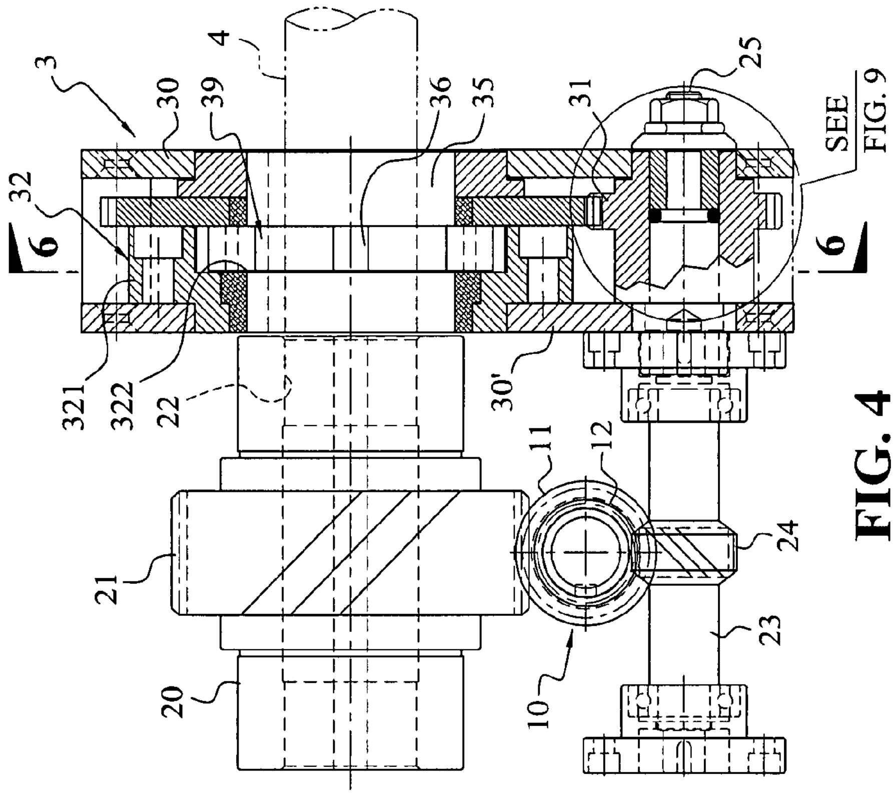
FIG. 4 is a cross-sectional view of the governor device for door according to the present invention.
Figure 3:
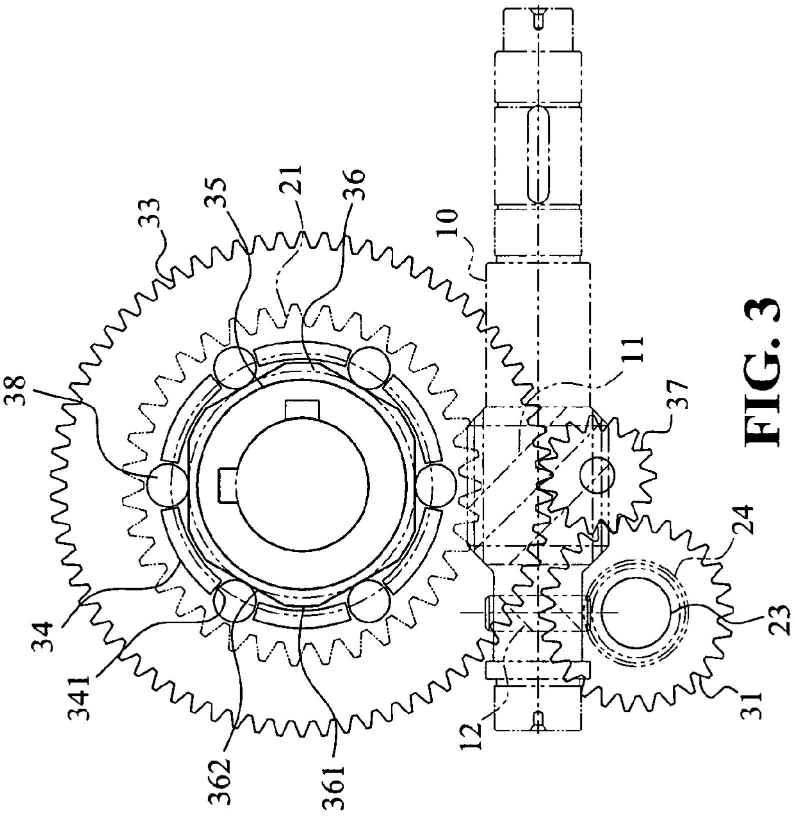
FIG. 3 is a side view for the governor device for door according to the present invention, wherein part of the components have been omitted.

FIG. 1 illustrates a perspective diagram for the assembly status of the governor device for door and the door machine according to the present invention. FIGS. 2 to 4 shows clearly and completely the features provided by the governor device according to the present invention, which comprises:

An input shaft 10, having both ends pivoted on a transmission box 2, one end of which is driven by a door machine 1 to rotate a first gear 11 and a second gear 12 provided at two positions on the other end inside the transmission box 2; a hollow shaft 20, which is orthogonal to the direction of the input shaft 10, having its both ends rotatively pivoted on the transmission box 2, and having a first driven gear 21 correspondingly meshed with the first gear 11, and the axle center being hollow serving as an housing portion 22 to accommodate and fix a reel 4 for winding door stripe panels which may be referred to as door slats, a curtain or shutter consisting of a plurality interlocking door slats (not shown); a third shaft 23, which is parallel to the hollow shaft 20 and orthogonal to the input shaft 10, having its both ends rotatively pivoted on the transmission box 2, and having a second driven gear 24 correspondingly meshed with the second gear 12, and the end in the same direction as the reel 4 being connected with an extension shaft 25. According to the present invention, the first gear 11 of the input shaft 10, the first driven gear 21 on the hollow shaft 20, and the second gear 12 and the second driven gear 24 on the third shaft 23 are rotated by a worm gear. The diameter of the first gear 11 of the input shaft 10 is larger than that of the second gear 12. The diameter of the first driven gear 21 of the hollow shaft 20 is also larger than that of the second driven gear 24 of the third shaft 23. Therefore, a rotation speed difference is maintained between the hollow shaft 20 and the third shaft 23.

A brake device 3 is provided between a pair of parallel base plates 30, 30', and the pair of base plates 30, 30' are fixed at the side in the same direction with the transmission box 2 and the reel 4, and; integral therewith. The brake device 3 comprises an active gear 31 with the center fixed on the extension shaft 25 at the other end of the third shaft 23. A passive gear 33 is pivoted on a first hub 35, and the first-hub 35 is fixed with the reel 4 and together rotated with the hollow shaft 20. An idle wheel 37 is located between the active gear 31 and the passive gear 33 for adjusting the rotation speed of the passive gear 33 to be the same as the hollow shaft 20. A clutch mechanism 39 is provided for restraining the synchronous operation between the passive gear 33 and the first hub 35 under no positional difference condition.

Figure 5A:
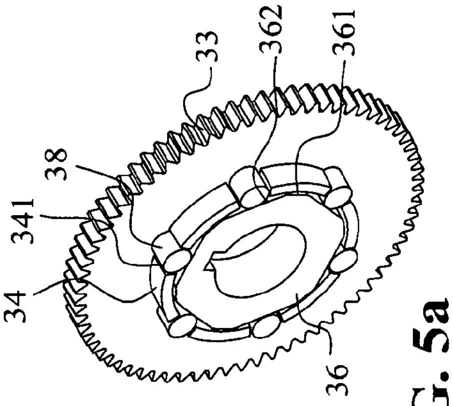
FIG. 5*a* is a perspective view of the assembly configuration of FIG. 5.
Figure 5:
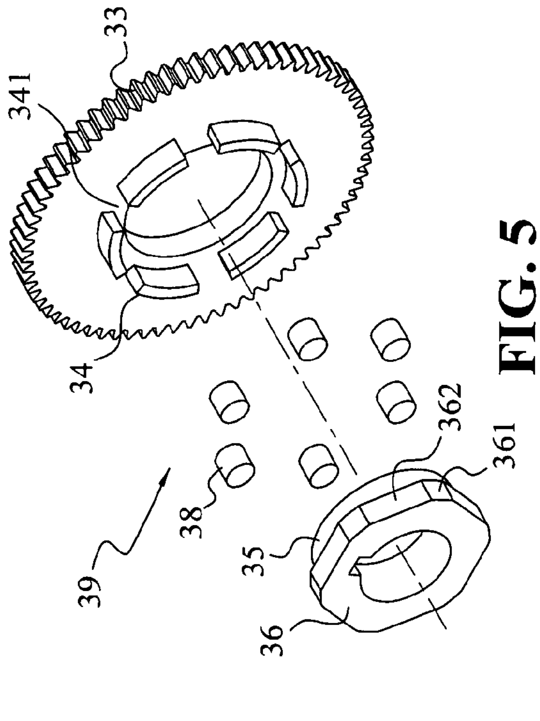
FIG. 5 is an exploded perspective view of the clutch mechanism according to the present invention, wherein the other components have been omitted.

In FIG. 5 and FIG. 5*a*, the features of the clutch mechanism 39 according to the present invention could be further appreciated. The clutch mechanism 39 according to the present invention comprises: a cam 36 formed at one end of the first hub 35, the circumference of the cam 36 is formed with a plurality of raised portions 361 and recessed portions 362; a plurality of protruding tabs 34 being formed, corresponding to the each raised portion 361, on the side face of the passive gear 33 along the circumference of a circle, the internal diameter of which is slightly larger than the external diameter of the cam 36, and surrounded on the outer rim of the cam 36, and a notch 341 being formed between any two adjacent protruding tabs 34; and, a plurality of rolling posts 38, inserted in the notch 341, with the width of the notch 341 being slightly larger than the diameter of the rolling post 38. Moreover, the clutch mechanism 39 further includes a restrain portion 32, which has a ring portion 321 fixed on the base plate 30' opposite to the clutch mechanism 39 through a plurality of screwed parts (omitted in the drawing). The inner side of the ring portion 321 is formed as a circular housing portion 322 for restraining the operation of the cam 36, the protrusions 34, and the rolling posts 38 within the circular space of the accommodation portion 322 under no positional difference condition.

Figure 7:
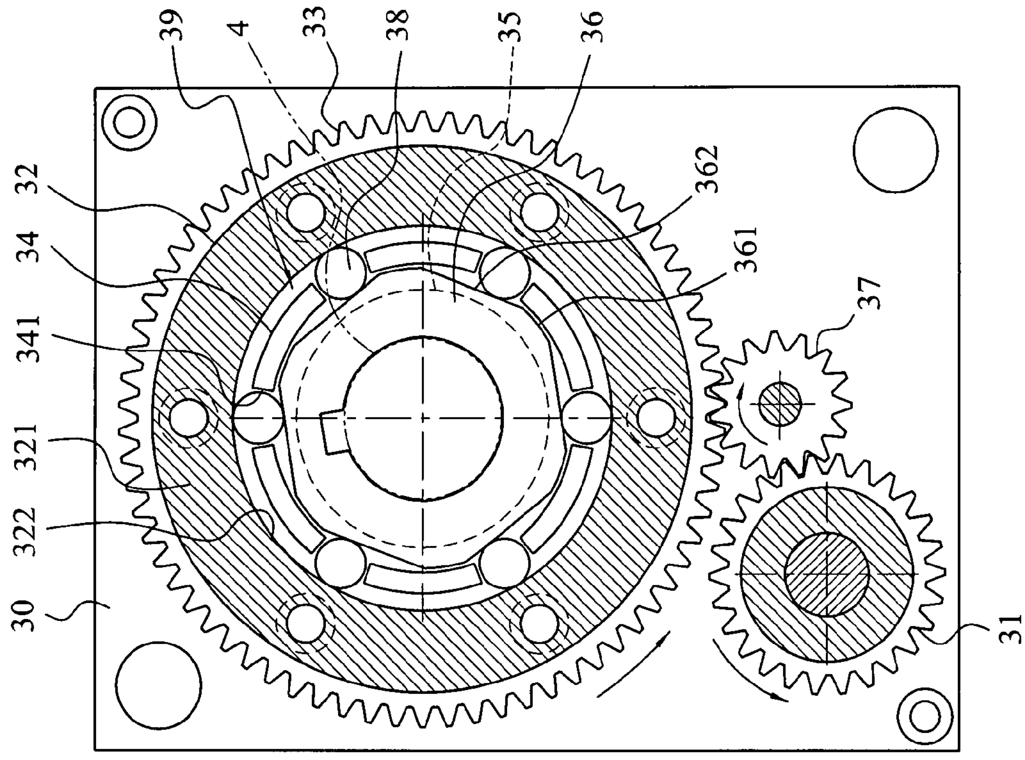
FIG. 7 illustrates the asynchronous operation status for the clutch mechanism in FIG. 6.
Figure 6:
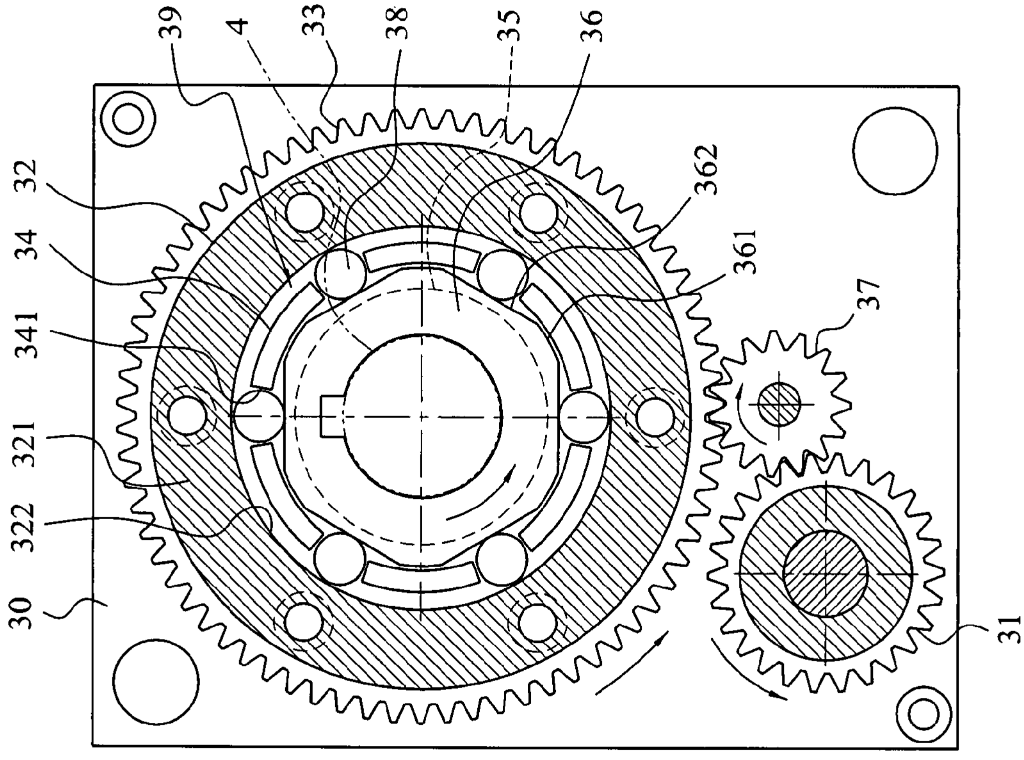
FIG. 6 is a cross-section taken along the 6-6 line in FIG. 4, wherein the clutch mechanism is shown in the synchronous operation status.

According to the present invention, the speed limit device for door, as shown in FIG. 6, in normal operation, the protrusion 34 and the raised portion 361 are located on the same center line, and the notch 341, the rolling post 38 and the recessed portion 362 are located on the same center line. At this time, the clutch mechanism 39 could restrain the passive gear 33 and the first hub 35 in synchronous operation within the circular space in the accommodation portion 322 of the restrain portion 32 under no positional difference condition. If there is any abnormal change in the rotation speed of the reel 4 due to, for example, the abrasion of the first driven gear 21 of the hollow shaft 20 driving the reel 4 or the encountering of obstacle during lifting and descending of the rolling door to cause the exceeding or lagging of the rotation speed of the reel 4 to that of the passive gear 33, the protrusion 34 and the raised portion 361 will have relative positional difference therebetween, which results in the misalignment of both on the same center line, and the positions for the notch 341, the rolling post 38, and the recessed portion 362 will be staggered in such a manner as shown in FIG. 7 that the clutch mechanism 39 will provide the mechanical force to lock the first hub 35 and brake the reel 4. A conventional overload protection device (not shown) is used to cut off the power for the door machine 1 to prevent from the fast falling of the rolling door or the damage of the transmission mechanism.

Figure 9:
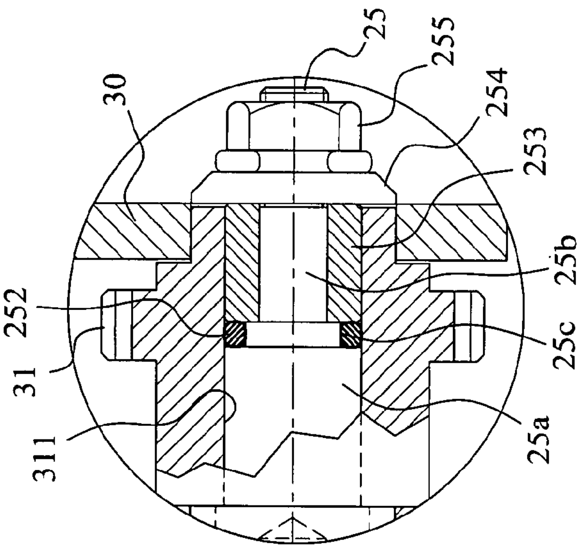
Figure 8:
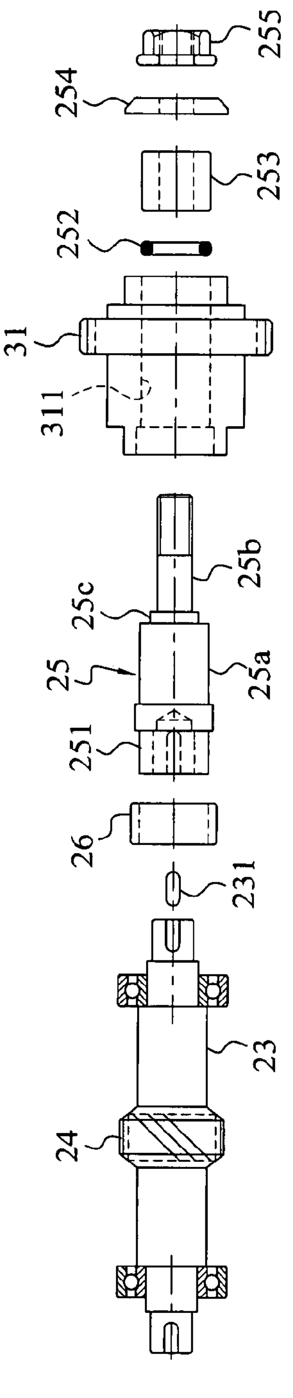
FIG. 8 is an exploded perspective view of the third shaft and the extension shaft according to the present invention; and, FIG. 9 is a partial cross-sectional view for the encircling part in FIG. 4.

Furthermore, after the first hub 35 and brake the reel 4 is locked by the mechanical force provided by the clutch mechanism 39, if the overload protection device for the door machine 1 does not cut off the power, the present invention also provides a protection means for this case. As shown in FIG. 8, one end of the extension shaft 25 is formed with a second hub 251 corresponding to the end of the third shaft 23, the second hub 251 and the third shaft 23 are engaged and connected as a whole through a key portion 231 and a shaft coupling 26 to become integral. The extension shaft 25 and the axle hole 331 of the active gear 31 are loosely fitted therebetween, and both of them become frictional contact by an elastic body 312 which is pressed and deformed by both. One end of the extension shaft 25 is formed with a large diameter portion 25*a* corresponding to the axle hole 311 of the active gear 31, and the other end is formed with a small diameter portion 25*b*, and both of them are formed with an housing portion 25*c* therebetween. An annular elastic body 252 is accommodated in the housing portion 25*c*. A sleeve 253, invaginated on the outer side of the small diameter portion 25*b* with one end abutted against the annular elastic body 252. A nut 255 and a washer 254 are threaded and fixed at the end of the extension shaft 25, and forced by the other end of the sleeve 253 to press the elastic body 252, so that a friction force (as shown in FIG. 9) is generated between the extension shaft 25 and the axle hole 311 of the active gear 31. According to the present invention, the active gear 31 has the friction force sufficient to drive the passive gear 33 without load, but not large enough to drive the passive gear 33 with load. Thus, if the clutch mechanism 39 is locked, the active gear 31 will release from the transmission of the extension shaft 25 due to the exceeding of the load force over the friction force. Even the clutch mechanism 39 is locked and the overload protection device does not cut off the power, transmission mechanism will not suffer the damage.

The foregoing are the preferred embodiments for the description of the present invention, not intend to limit the scope of the present invention, and the equivalent changes and modifications without departing from the scope of claims of the present invention should be considered to be within the scope of the present invention.

EXPLANATION OF MAIN COMPONENTS

1 door machine
2 transmission box
3 Brake device
4 Reel
10 Input shaft
11 First gear
12 Second gear
20 Hollow shaft
21 Gear
22 housing portion
23 Third shaft
231 Key portion
24 Gear
25 Extension shaft
25*a* Large diameter portion
25*b* Small diameter portion
25*c* housing portion
251 Hub
252 Elastic body
253 Sleeve
254 Washer
255 Nut
26 Shaft coupling
30 Base plate
30' Base plate
31 Active gear
311 Axle hole
32 Restraint portion
321 Ring portion
322 housing portion
33 Passive gear
34 protruding tab
341 Notch
35 Hub
36 Cam
361 Raised portion
362 Recessed portion
37 idle wheel
38 Rolling post
39 Clutch mechanism

I claim:

1. A governor device for door, comprising:

an input shaft (10), having two ends and one end of which receives a driving force from a door machine (1) to rotate a first gear (11) and a second gear (12) provided at two positions on the other end;

a hollow shaft (20), with two ends rotatively pivoted, being provided with a first driven gear(21) correspondingly meshed with the first gear (11), and the hollow shaft for said first driven gear (21) serving as a first housing portion (22) for accommodating and fixing one end of a reel (4) for winding the door strip panels;

a third shaft (23), with two ends rotatively pivoted, being provided configured with a second driven gear (24) correspondingly meshed with said second gear (12), and having an extension shaft (25) on the end in the same direction of the reel (4);

a brake device (3), which comprises: an active gear (31) with its center fixed on the extension shaft (25) of said third shaft (23); a passive gear (33), pivoted on a first hub (35), and the first hub (35) being fixed on the reel (4) and rotated together with the hollow shaft (20); an idle wheel (37), located between the active gear (31) and the passive gear (33) for adjusting a rotation speed of the passive gear (33) to be the same as the hollow shaft (20); and, a clutch mechanism (39), for restraining a synchronous operation between the passive gear (33) and the first hub (35) under no positional difference condition, and when a rotation speed of the reel (4) has abnormal change, the clutch mechanism (39) will be actuated to lock the first hub (35) and brake the reel (4).

2. A governor device for door according to claim 1, wherein said hollow shaft (20) is parallel to said third shaft (23) and orthogonal to said input shaft (10), and all three of them are housed in a transmission box (2).

3. A governor device for door according to claim 2, wherein a diameter of said first gear (11) on said input shaft (10) is larger than a diameter of said second gear (12), and a diameter of said first driven gear (21) on said hollow shaft (20) is larger than a diameter of said second driven gear (24) on said third shaft (23).

4. A governor device for door according to claim 3, wherein said first gear (11) and said second gear (12) of said input shaft (10), and said first driven gear (21) on said hollow shaft (20) and said second driven gear (24) on said third shaft (23) are all worm gears.

5. A governor device for door according to claim 4, wherein the brake device (3) is provided between a pair of parallel base plates (30, 30'), and the pair of base plates are fixed on one side of the transmission box (2) and integral with it.

6. A governor device for door according to claim 5, wherein the clutch mechanism (39) includes:

a cam (36), formed on one end of the hub (35), which is formed with a plurality of raised portions (361) and recessed portions (362) on a circumference, a plurality of protruding tabs (34) being formed, each corresponding to each raised portion (361), on a side face of the passive gear (33) along the circumference of a circle, which encircles around said cam (36), a notch (341) being formed between any two adjacent protruding tabs (34); and a plurality of rolling post (38) inserted in the notches (341).

7. A governor device for door according to claim 6, wherein said clutch mechanism (39) further includes a restrain portion (32), which is fixed and has a second housing portion (322) for restraining the cam (36), the protruding tabs (34) and the rolling posts (38) to operate within a space.

8. A governor device for door according to claim 7, wherein the internal diameter of the protruding tabs (34) is slightly larger than the external diameter of the cam (36), and a width of the notch (341) is slightly larger than a diameter of the rolling post (38), and the protruding tabs(34) and the raised portions (361) are located on the same center line, and the notch (341), the rolling posts (38) and the recessed portions (362) are located on the same center line.

9. A governor device for door according to claim 8, wherein said restrain portion (32) has a ring portion (321), which is fixed on the base plate (30') in an opposite direction of the clutch mechanism (39) through a plurality of screwed components, and an inner side of the ring portion (321) is formed as the second housing portion (322).

10. A governor device for door according to claim 9, wherein one end of the extension shaft (25) is formed with a second hub (251) corresponding to the end of the third shaft (23), the second hub (251) and said third shaft (23) and both of them are invaginated with each other and connected with a shaft coupling (26) and a key portion (231), to become integral.

11. A governor device for door according to claim 10, wherein the extension shaft (25) and an axle hole (311) of the active gear (31) are loosely fitted therebetween, and both of them become frictional contact by an annular elastic body (252) when it is pressed and deformed by both.

12. A governor device for door according to claim 11, wherein one end of the extension shaft (25) is formed with a large diameter portion (25*a*) corresponding to the axle hole (311) of the active gear (31), the other end being formed with a small diameter portion (25*b*), both of them being formed with a third housing portion (25*c*), the annular elastic body (252) being accommodated in the third housing portion (25*c*), a sleeve (253) being invaginated on the outer side of the small diameter portion (25*b*) with one end abutted against the annular elastic body (252) a nut (255) and a washer (254) being fixed at the end of the extension shaft (25), and forcing the sleeve (253) to press the annular elastic body (252) so that a friction force is generated between the extension shaft (25) and the axle hole (311) of the active gear (31).

* * * * *